(12) United States Patent
Walker et al.

(10) Patent No.: US 7,769,612 B1
(45) Date of Patent: Aug. 3, 2010

(54) SYSTEM AND METHOD FOR FACILITATING THE SALE OF A TRAVEL PRODUCT

(75) Inventors: Jay S. Walker, Ridgefield, CT (US); Maximillian O. Urbahn, New Canaan, CT (US); Daniel E. Tedesco, Huntington, CT (US); Keith Bemer, New York, NY (US)

(73) Assignee: priceline.com, Incorporated, Norwalk, CT (US)

( * ) Notice: Subject to any disclaimer, the term of this patent is extended or adjusted under 35 U.S.C. 154(b) by 1281 days.

(21) Appl. No.: 10/070,073

(22) PCT Filed: Aug. 30, 2000

(86) PCT No.: PCT/US00/23912

§ 371 (c)(1),
(2), (4) Date: Oct. 3, 2002

(87) PCT Pub. No.: WO01/16844

PCT Pub. Date: Mar. 8, 2001

Related U.S. Application Data

(60) Provisional application No. 60/151,659, filed on Aug. 31, 1999.

(51) Int. Cl.
*G06Q 10/00* (2006.01)
*G06Q 30/00* (2006.01)

(52) U.S. Cl. ............................................. 705/7; 705/26
(58) Field of Classification Search .................... 705/26, 705/27, 5, 6
See application file for complete search history.

(56) References Cited

U.S. PATENT DOCUMENTS

| | | | |
|---|---|---|---|
| 4,775,936 A | 10/1988 | Jung | |
| 5,021,953 A | 6/1991 | Webber et al. | |
| 5,270,921 A | 12/1993 | Hornick | |
| 5,331,546 A * | 7/1994 | Webber et al. | 705/6 |

(Continued)

FOREIGN PATENT DOCUMENTS

JP        06075982        3/1997

(Continued)

OTHER PUBLICATIONS

Tasker, F., "Should We Send the Bad Guys' Guns to the Contras?" Miami Herald, final edition, p. 1D, Mar. 26, 1986.*

(Continued)

*Primary Examiner*—Nicholas D Rosen
(74) *Attorney, Agent, or Firm*—Walter G. Hanchuk; Chadbourne & Parke LLP

(57) ABSTRACT

A system and method for facilitating the sale of travel products is disclosed. The system receives travel inquiries from requesters for preferred travel products (905). The system in turn selects and offers the requester an alternate travel product which has a greater value to the seller if sold than the requester's preferred travel product (925). Various systems and methods are disclosed for determining whether an alternate travel product has a greater value to the seller if sold than the preferred travel product. Exemplary determinations are based on profit margin and load factor discrepancy between the preferred travel product and the alternate travel product. The system further provides for the selection and offering of a benefit in conjunction with a requester's acceptance of an alternate travel product, and for the selection of the benefit based on the differences between the requester's preferred travel product and the alternate travel product.

1 Claim, 14 Drawing Sheets

U.S. PATENT DOCUMENTS

| | | | |
|---|---|---|---|
| 5,652,867 | A | 7/1997 | Barlow et al. |
| 5,822,735 | A * | 10/1998 | De Lapa et al. ............... 705/14 |
| 5,832,457 | A * | 11/1998 | O'Brien et al. ............... 705/14 |
| 5,897,620 | A | 4/1999 | Walker et al. |
| 5,918,209 | A | 6/1999 | Campbell et al. |
| 5,933,813 | A | 8/1999 | Teicher et al. |
| 5,948,040 | A * | 9/1999 | DeLorme et al. ............ 701/201 |
| 6,055,513 | A * | 4/2000 | Katz et al. .................... 705/26 |
| 6,085,164 | A | 7/2000 | Smith et al. |
| 6,085,976 | A * | 7/2000 | Sehr ........................... 235/384 |
| 6,112,185 | A * | 8/2000 | Walker et al. ................... 705/5 |
| 6,119,094 | A * | 9/2000 | Lynch et al. .................... 705/5 |
| 6,820,062 | B1 * | 11/2004 | Gupta et al. ................... 705/16 |
| 7,016,864 | B1 | 3/2006 | Notz et al. .................... 705/26 |
| 7,249,050 | B1 * | 7/2007 | Walker et al. ................. 705/14 |
| 2001/0051895 | A1 * | 12/2001 | Giuliani et al. ............... 705/14 |
| 2002/0184059 | A1 * | 12/2002 | Offutt et al. .................... 705/5 |
| 2006/0206393 | A1 * | 9/2006 | Brown et al. ................. 705/26 |

OTHER PUBLICATIONS

Dinell, D., "Businesses Taking a Hard Look at Air Travel as Fares Increase," Wichita Business Journal, vol. 5, No. 27, s. 1, p. 18, Sep. 10, 1990.*

Clemons, E.K. et al., "Segmentation, Differentiation, and Flexible Pricing: Experiences with Information Technology and Segment-Tailored Strategies," Journal of Management Inforamtion Systems, vol. 11, No. 2, pp. 9-36, Fall 1994.*

White, K., "Budget Drives Their Message with New Debit Card," Incentive, vol. 171, No. 12, p. 57, Dec. 1997.*

Anon., "iCat Offers Every Business in the World a Free Store on the Internet," PR Newswire, Apr. 13, 1998.*

Anon., "Netcom Includes E-Commerce Software as Standard Feature in Web Hosting Line; Company Is Only ISP to Offer Open Market ShopSite Manager Lite," Business Wire, Sep. 10, 1998.*

Ott, K., "Sites Give Customers More Autonomy" (Abstract), Advertising Age's Business Marketing, vol. 84, No. 8, p. 38, Aug. 1999.*

Johnson, J.L., "Family Dollar on the Move," Discount Merchandiser, vol. 34, No. 1, p. 21, Jan. 1994.*

Anon., "Western Pacific Load Factor Reaches 55 Percent in September," Aviation Daily, vol. 322, No. 4, p. 30, Oct. 5, 1995.*

Howard, "New PCs, Old Software," PC Magazine, vol. 14, No. 22, p. 95, Dec. 19, 1995.*

Anon., "Pacific Bell Proposes Increase in ISDN Rates," ISDN News, vol. 9, No. 2, Jan. 16, 1996.*

Anon., "Boffin Limited: Boffin Limited Is First to Standardize CD-ROM Jukeboxes and Towers with One-Year Warranty," Nov. 11, 1997.*

Caldwell, B., "Hotels Pull a Switch," Informationweek, No. 684, pp. 127-128, Jun. 1, 1998.*

Anon., "DOT Wants More Data From American, United on Chicago-London Winter Plans," Aviation Daily, vol. 333, No. 36, p. 312, Aug. 20, 1998.*

Popyk, "The Mastercard Approach to Customer Service," Music Trades, vol. 146, No. 12, p. 89, Jan. 1999.*

Juliano, S., "Excursions in Advance," Leisure Travel News, vol. 15, No. 18, p. 16, May 10, 1999.*

Zaccarelli, H., "Is Your 'Internal Marketing' up to Par?" Nation's Restaurant News, vol. 0, No. 0, p. 80, Aug. 27, 1990.*

Adams, E.J., "Web Watch: Indispensable Internet Sites for Global Traders," World Trade, vol. 9, No. 8, p. 4, Aug. 1996.*

Rosato, D., "On-Line Tips for Travelers," USA Today, Final edition, Bonus section, p. 08E, Mar. 25, 1997.*

* cited by examiner

ITINERARY DATABASE 400

| ITINERARY ID 410 | REQUESTER ID 420 | PREFERRED ITINERARY 430 | ALTERNATE ITINERARY 440 | BENEFIT RATING 450 | BENEFIT 460 | OFFER STATUS 470 |
|---|---|---|---|---|---|---|
| 99-001 | 000-0001 | 7/20/1999 #980 COACH | 7/20/1999 #980 COACH | 8 | 100 Frequent Flyer Miles | Accepted |
| | | 7/29/1999 #1640 COACH | 7/29/1999 #862 COACH | | | |
| 99-002 | 000-215 | 7/29/1999 #930 COACH | 7/29/1999 #930 COACH | 18 | 500 Frequent Flyer Miles | Rejected |
| | | 8/14/1999 #384 COACH | 8/14/1999 #384 COACH | | | |

401 → (row 99-001)
402 → (row 99-002)

FIG. 4

| Flight Number 515 | O and D Pair 520 | Departure Date 525 | Departure/ Arrival Time 530 | Availability 535 |
|---|---|---|---|---|
| 1640 | CLE/LGA | 07/29/1999 | 1200/1320 | 14-FIRST |
|  |  |  |  | 36-COACH |
| 862 | CLE/JFK | 07/29/1999 | 1600/1740 | 20-FIRST |
|  |  |  |  | 45-COACH |
| 1580 | JFK/SFO | 07/29/1999 | 1400/2015 | 17-FIRST |
|  |  |  |  | 31-COACH |
| 930 | JFK/SFO | 07/29/1999 | 730/1345 | 13-FIRST |
|  |  |  |  | 31-COACH |

502 → (1640 row)
504 → (862 row)
506 → (1580 row)
508 → (930 row)

INVENTORY DATABASE 500

| CURRENT PRICE 540 | PROFIT MARGIN 550 | CURRENT LOAD FACTOR 555 | OPTIMAL LOAD FACTOR 560 | PROJECTED LOAD FACTOR 570 | OPTIMAL LOAD FACTOR DISCREPANCY 575 | LOAD FACTOR THRESHOLD 580 |
|---|---|---|---|---|---|---|
| $1190 | $500 | 55% | 63% | 70% | 10% | 25% |
| $190 | $15 | 50% | 70% | 75% | -5% | 25% |
| $1220 | $600 | 45% | 70% | 65% | 10% | 25% |
| $220 | $30 | 35% | 65% | 60% | 5% | 20% |
| $1450 | $850 | 40% | 80% | 68% | 32% | 33% |
| $450 | $25 | 24% | 70% | 47% | 23% | 22% |
| $1500 | $750 | 56% | 60% | 70% | 1% | 30% |
| $500 | $75 | 56% | 75% | 73% | -6% | 27% |

Arrows: 502, 504, 506, 508

FIG. 5B

BENEFIT RATING DATABASE 600

| | CONDITION/FEATURE 620 | RATING 630 |
|---|---|---|
| 601 | Airport < 20 Miles | 4 |
| 602 | 20 < Airport > 50 | 8 |
| 603 | 50 < Airport | 15 |
| 604 | Travel Date 1 Day Different | 4 |
| 605 | Travel Date 3-4 Days Different | 10 |
| 606 | Travel Date More Than 4 Days Different | 15 |
| 607 | Travel Time 1 Hour Different | 1 |
| 608 | Travel Time 2-4 Hours Different | 4 |
| 609 | Travel Time 5-8 Hours Different | 8 |
| 610 | Travel Time More Than 9 Hours Different | 10 |
| 611 | Business to Coach | 5 |
| 612 | First Class to Business | 7 |
| 613 | First Class to Coach | 10 |

FIG. 6

BENEFIT DATABASE 700

| Total Benefit Rating 710 | Benefit 720 |
|---|---|
| 1-5 | 50 Frequent Flyer Miles |
| | $20 Discount On Hotel Room |
| 6-10 | 100 Frequent Flyer Miles |
| | $40 Discount On Rental Car |
| 11-15 | 200 Frequent Flyer Miles |
| | 10% Discount On Next Ticket |
| 16-20 | 500 Frequent Flyer Miles |
| | 15% Discount On Next Ticket |
| 21-25 | 1000 Frequent Flyer Miles |
| | 20% Discount On Next Ticket |
| 25-30 | 2000 Frequent Flyer Miles |
| | 25% Discount On Next Ticket |

FIG. 7

REQUESTER DATABASE 800

| REQUESTER ID 810 | REQUESTER NAME 811 | ADDRESS 812 | PHONE 814 | CREDIT CARD 816 | PREFERRED BENEFIT 818 | ACCEPTED BENEFITS 820 |
|---|---|---|---|---|---|---|
| 000-215 | Dan Fey | 12 Springlawn Rd, Briarcliff, NY, 11898 | 914-596-1349 | 3725-010102-XXX | Travel Discount | $40 of Car Rental $100 of Hotel |
| 000-0001 | Margaret Smith | 131 Smith Street, Hawthorne, NY 11982 | 914-864-1123 | 4321-786453-XXX | Rebate | $20 Rebate $20 of Car Rental |
| 000-324 | Howard Jones | 45 Cobalt Lane, Smithtown, NY 11787 | 631-857-5432 | 4567-112345-XXX | Frequent Flyer Miles | 1000 Miles 500 Miles $20 Rebate |

FIG. 8

SYSTEM AND METHOD FOR FACILITATING THE SALE OF A TRAVEL PRODUCT

This application is a National Phase entry of and claims priority under 35 U.S.C. §365 and §371 to prior PCT Patent Application no. PCT/US00/23912, filed Aug. 30, 2000 entitled, "SYSTEM AND METHOD FOR FACILITATING THE SALE OF A TRAVEL PRODUCT," which in turn claims priority to prior U.S. Provisional Patent Application Serial No. 60/151,659 filed Aug. 31, 1999, entitled "SYSTEM AND METHOD FOR FACILITATING THE SALE OF A TRAVEL PRODUCT."

BACKGROUND

Currently, many airlines employ revenue management systems (RMS), such as the Talus™ AirRMS, in an attempt to allocate inventory more effectively to appropriate fare classes. By periodically adjusting the inventory available in a given fare class, an airline can more nearly optimize the revenue generated through the sale of inventory. As the flight date approaches, more inventory tends to be allocated to the more expensive fare classes. As such, airlines are able to ensure that they are charging the least price-sensitive segment of their customer base a near optimal price. The price-bias of such a system is designed to target different population segments in which customers fall.

One way to measure the effects of the price-bias or restrictive-bias associated with a given flight is to measure the load factor associated with a given flight. A load factor is defined as a percentage of tickets currently booked for a given flight as compared to the total number of tickets available for the flight. For example, a 95% load factor associated with a given flight indicates that 95% of the tickets that are available for the flight have been booked, with 5% remaining unbooked. Typically a small load factor indicates that tickets were too expensively priced or that there were too many restrictions imposed for the given flight, thereby discouraging customers from purchasing them. Conversely, large load factors typically indicate that prices were not expensive enough or that the imposed restrictions were not strict enough. In such cases an airline may have traded higher margins for a larger volume of ticket sales that may result in a dilutionary effect on over-all sales in the long run.

By under-booking a flight (e.g., allocating a relatively greater amount of inventory to more expensive fare classes so as to purposefully not sell all available inventory), an airline is able to insure that tickets are not sold at too inexpensive a price. By over-booking a flight (i.e., purposefully booking too many tickets) the airline is able to account for "no-shows", or customers who purchase a ticket but fail to arrive at the appropriate airport gate in time for departure. Using known revenue management techniques, airlines can estimate how much to under-book or over-book a given flight based on such factors as the historical and current demand for the given flight. Both under-booking and over-booking levels are measured by load factors. For example, an airline may determine that the appropriate booking level for a given flight may be 105% (e.g., on a 100 seat flight, 105 tickets should be booked). Similarly, an airline may determine that the appropriate booking level for a given flight may be 75% (e.g., on a 100 seat flight, only 75 tickets should be booked).

Airline customers generally may be categorized as either business travelers or leisure travelers. Business travelers are typically less price-sensitive than leisure travelers, but are also less flexible in their travel arrangements. Accordingly, by associating certain travel restrictions with discounted fare classes, airlines can successfully "fence out" business travelers from purchasing discount tickets. This is done because business travelers typically have the resources to afford more expensive fares. Imposing such restrictions creates a restrictive-bias designed to separate an airline's customer base into different groups, each group having different price sensitivity and travel flexibility.

For many travelers, especially leisure travelers, the inconvenience associated with making slight alterations to a given set of travel plans is relatively low. Leisure travelers typically make their travel arrangements well in advance and are receptive to changing those arrangements, especially if a benefit of some sort is offered to them. The advantage an airline can gain from such changes in travel plans is relatively high. For example, an airline will often overbook a given flight and subsequently offer benefits to customers who agree to travel on a different flight. The increased revenue in ticket sales from overbooking gained by the airline typically exceeds the cost associated with moving overbooked passengers from one flight to another. Leisure travelers who agree to be "bumped" from one flight to another typically perceive the benefit gained to be greater than the inconvenience of switching flights. By increasing their ability to bump customers, and thereby more efficiently control the demand for various itineraries, airlines could substantially increase their revenue.

For the foregoing reasons, there is a need for a system and method of facilitating the sale of travel products while maintaining both a price bias and a product bias.

SUMMARY

The present method and system is directed to a system and method that satisfies this need by proactively marketing alternative travel products, the sale of which are economically more beneficial to the seller than the sale of the requested travel product.

The method and system disclosed herein enables merchants of travel products, such as airlines, to more effectively sell their inventory by more evenly distributing customer demand across available inventory. Generally, the present method and system enables merchants of travel products to shape customer demand to more accurately correspond to available inventory by proactively marketing certain travel products over others on a per transaction basis. In addition, the presently disclosed method and system can reduce the amount of overbooking that is necessary for a given flight, thereby reducing the ill-will that may result from prior overbooking methods.

One embodiment of the present method and system provides for (1) receiving a travel inquiry from a requester, (2) retrieving a requested travel product and at least one alternate travel product based on the travel inquiry, (3) determining whether the alternate travel product has greater value to the seller than the preferred travel product, (4) transmitting an offer to sell an alternative travel product having a greater value to the seller if sold than the preferred travel product and (5) receiving an acceptance to purchase the alternate travel product.

According to further aspects of the method and system, in determining whether the sale of the alternate travel product has a greater value to the seller than the sale of the preferred travel product, the merchant server may consider the inventory, profit margin, current load factor, potential load factor and/or the load factor discrepancy between the preferred travel product and the alternate travel product.

In accordance with other aspects of the method and system, a benefit is offered in conjunction with the alternate travel product. The benefit is selected based on a benefit rating associated with the alternate travel products. The larger the difference between the preferred travel product and the alternate travel product the greater the benefit rating associated with the alternate travel product. The benefit may include additional frequent flier miles, a price discount, a traveling class upgrade and/or a package deal including other travel products.

These embodiments of the method and system provides travel product providers, such as airlines, hotels and car rental agencies, with a system and method for maximizing revenues by directing travelers to travel products that are economically more beneficial to the seller. For example, an airline may benefit by directing potential travelers from an almost fully booked flight to a less booked flight or may direct travelers away from an under booked flight so that the under booked flight may be cancelled. Similarly, a hotel may direct travelers away from rooms during an anticipated busy holiday weekend or convention to a less busy time. In this way the hotel will fill the rooms during busy periods with more product sensitive travelers while steering less product sensitive travelers to off-peak times.

BRIEF DESCRIPTION OF THE DRAWINGS

These and other features, aspects and advantages of the present method and system will become better understood with regard to the following description, appended claims and accompanying drawings where:

FIG. 4 is a tabular representation of an itinerary database maintained by a merchant server depicted in FIG. 2.

FIGS. 5A and 5B are tabular representations of an inventory database maintained by a RMS shown in FIG. 3.

FIG. 6 is a tabular representation of a benefit rating database used by a merchant server shown in FIG. 2.

FIG. 7 is a tabular representation of a benefit database used by a merchant server shown in FIG. 2.

FIG. 8 is a tabular representation of a requester database used by a merchant server shown in FIG. 2.

DETAILED DESCRIPTION

Figure 1:
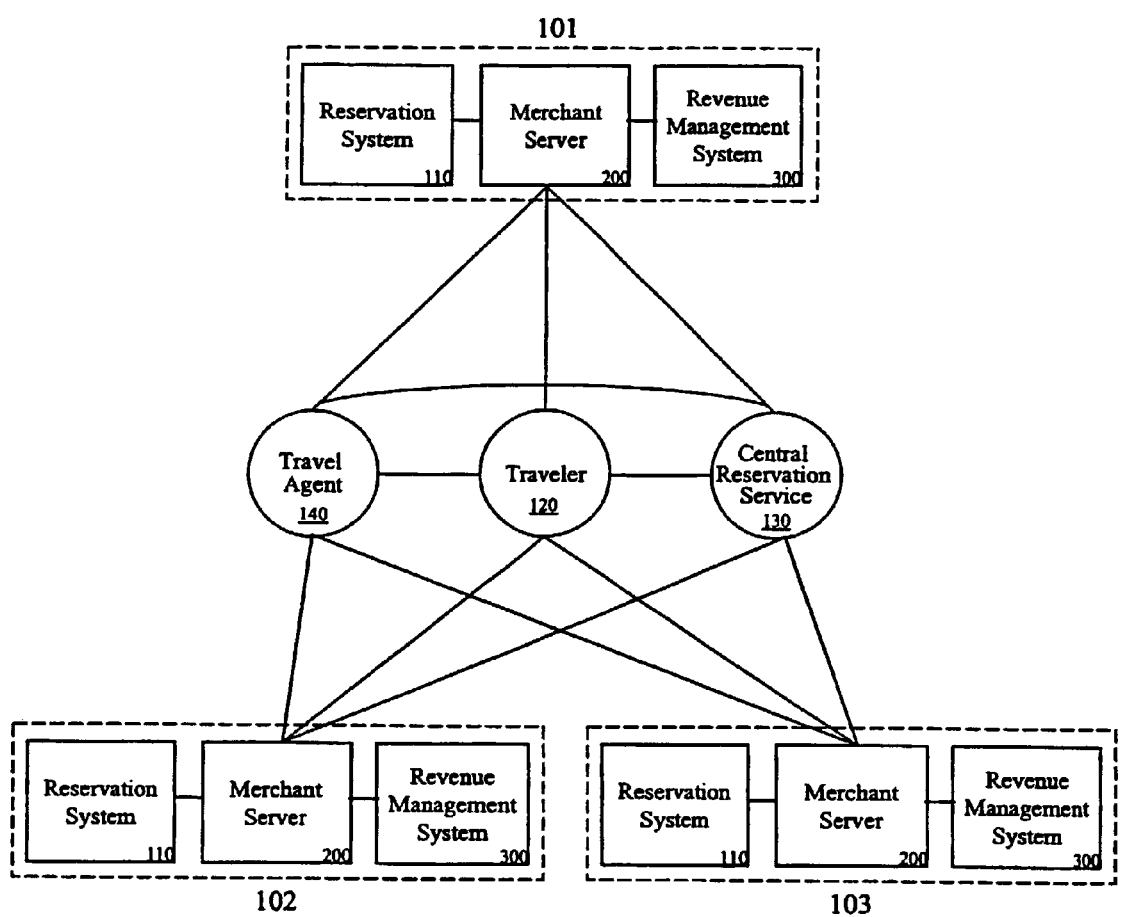
FIG. 1 is a block diagram depicting an overview of the inventive system.

The examples and explanations discussed hereafter focus on airline tickets or itineraries as an exemplary travel product. However, it should be understood that the method and system is equally applicable to the sale of all travel products, including, hotels rooms, car rentals, train tickets and equivalent products, including, movie tickets, play tickets, sports tickets and the like.

I. Terms and Definitions

As used herein the following terms are defined to mean:

Alternate Travel Product—a travel product selected based on the travel inquiry received from the requester wherein the travel product may vary by one or more data elements from the preferred travel product such as by itinerary, e.g., travel date, class, or the like. Typically the travel products associated with the alternate itinerary produce a more beneficial economic effect for a seller when sold.

Benefit—a product, discount, package deal or the like awarded to a requester in exchange for accepting an alternate itinerary as opposed to a preferred itinerary.

Current Load Factor—a percentage representing the number of tickets currently booked for a given flight as compared to the total number of tickets available for the flight.

Load Factor—a percentage representing the number of tickets booked for a given flight as compared to the total number of tickets available for the flight.

Optimal Load Factor—a load factor associated with a given flight that is estimated to produce near optimal revenue without damaging existing pricing structures.

Load Factor Discrepancy—the difference between the optimal and projected or current load factor associated with a given flight.

Load Factor Threshold—the minimum load factor associated with a given flight below which it is no longer acceptable for an airline to sell tickets for the flight.

Package Deal—an offer including supplemental products offered at a discount on the condition that a requester accept an alternate itinerary instead of the preferred itinerary.

Preferred Travel Product—the travel product or itinerary that is determined based on a travel inquiry received from a requester.

Projected Load Factor—an estimated load factor associated with a given flight, based in part on the current load factor, historical sales data and the like.

Requester—a corporate or private travel agent, central reservation system or a private consumer or traveler who submits a travel inquiry for a travel product.

Travel Product Record—data indicative of a travel product, such as a flight number, travel dates, desired class ($1^{st}$, business, coach, etc.) and the like.

Travel Inquiry—travel data received from a requester for a particular travel product or itinerary.

Travel Product—any travel related product or service including (1) airline tickets, (2) hotel rooms, (3) rental cars, (4) cruise tickets, (5) train tickets, (6) any combination or equivalent thereof.

II. Introduction

The method and system selects and offers an alternate travel product to a traveler when the alternate travel product provides a greater economic benefit to the seller than the requested travel product. In this method and system a merchant server receives a travel inquiry from a requester indicative of a preferred travel product. The merchant server then retrieves travel product records for the preferred and alternate travel products from the revenue management system (RMS). The travel product record includes revenue management factors such as profit margins, current load factors, optimal load factor and the like generated by a revenue management system (RMS). The merchant server uses these factors to determine if there is an alternate travel product that is more economically beneficial to the merchant if sold than the sale of the requested travel product. If so, the merchant server offers the requester the alternate travel product. In conjunction with the alternate travel product the merchant server may also offer a benefit as a means of encouraging the requester to accept the alternate travel product.

III. System Architecture

FIG. 1 shows one embodiment of the system. In the illustrated embodiment, the system includes a plurality of travel product sellers 101, 102, 103 each having a merchant server 200 operated in communication with a revenue management system (RMS) 300 and a reservation system 110. Travelers 120, travel agents 140 and central travel servers 130 may all communicate with the travel product sellers either directly or indirectly.

System Components

Referring to FIG. 1, each travel product seller 101, 102, 103 has a merchant server 200, revenue management system (RMS) 300 and reservation system (RS) 110 that may each be implemented as single general purpose computers as described below. In the case of an airline, the reservation system is an airline reservation system (ARS). In other embodiments the functionality of the merchant server 200, RMS 300 and RS 110 may be combined into a single computer or distributed over a plurality of computers. The RMS 300, RS 110 and requester device 120 are connected directly or indirectly to merchant server 200 and the merchant server 200 is connected to travelers 120, travel agents 140 and/or central reservation services 130 via conventional high-speed connection, such as, a local area network (LAN), a wide area network (WAN), an internet connection or the like, via a public switched phone network, dedicated data line, cellular network, personal communication system (PCS), microwave, satellite networks, cable or the like employing known communication protocols, such as TCP/IP.

Figure 2:
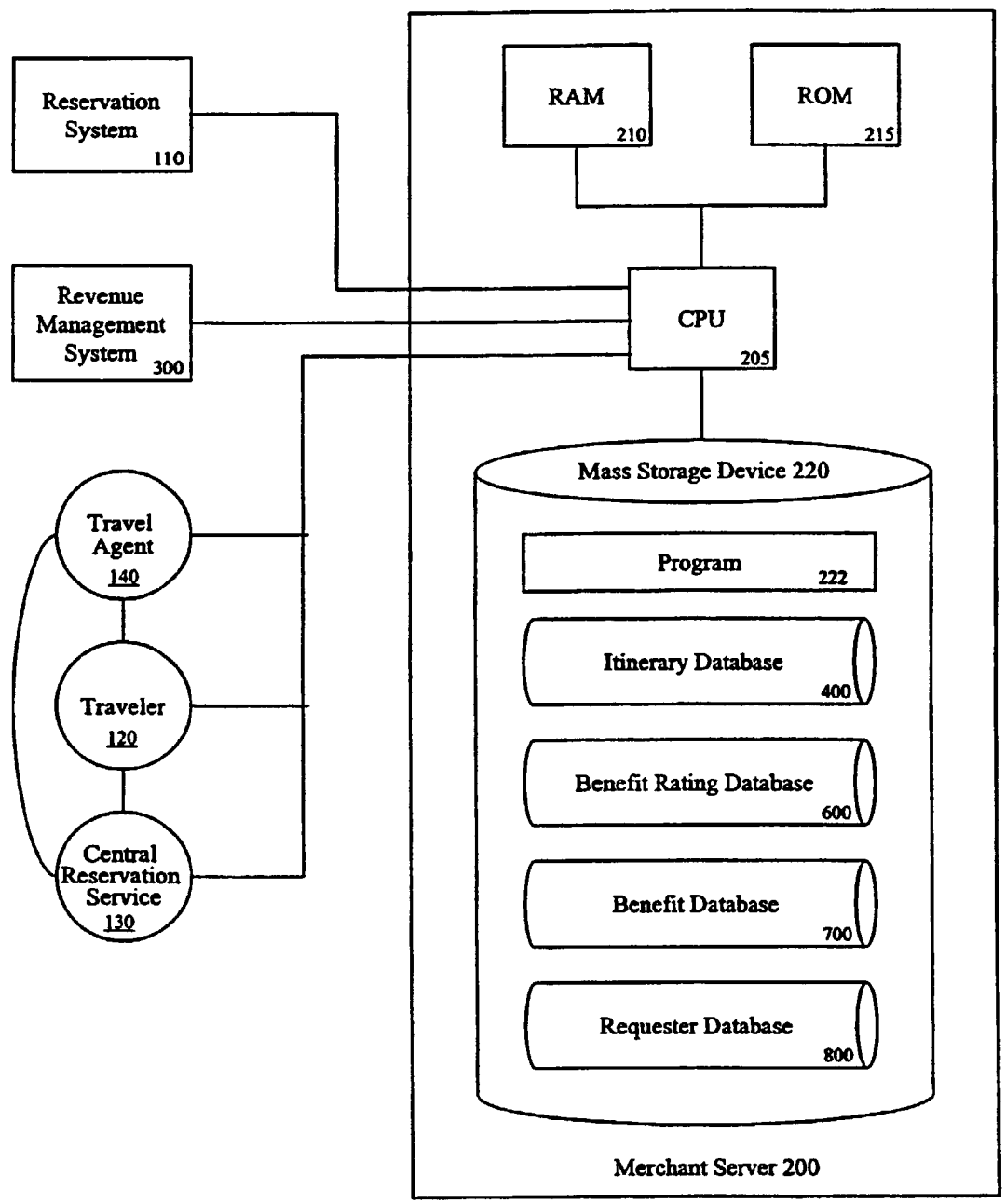
FIG. 2 is a block diagram depicting a merchant server of FIG. 1.
Figure 3:
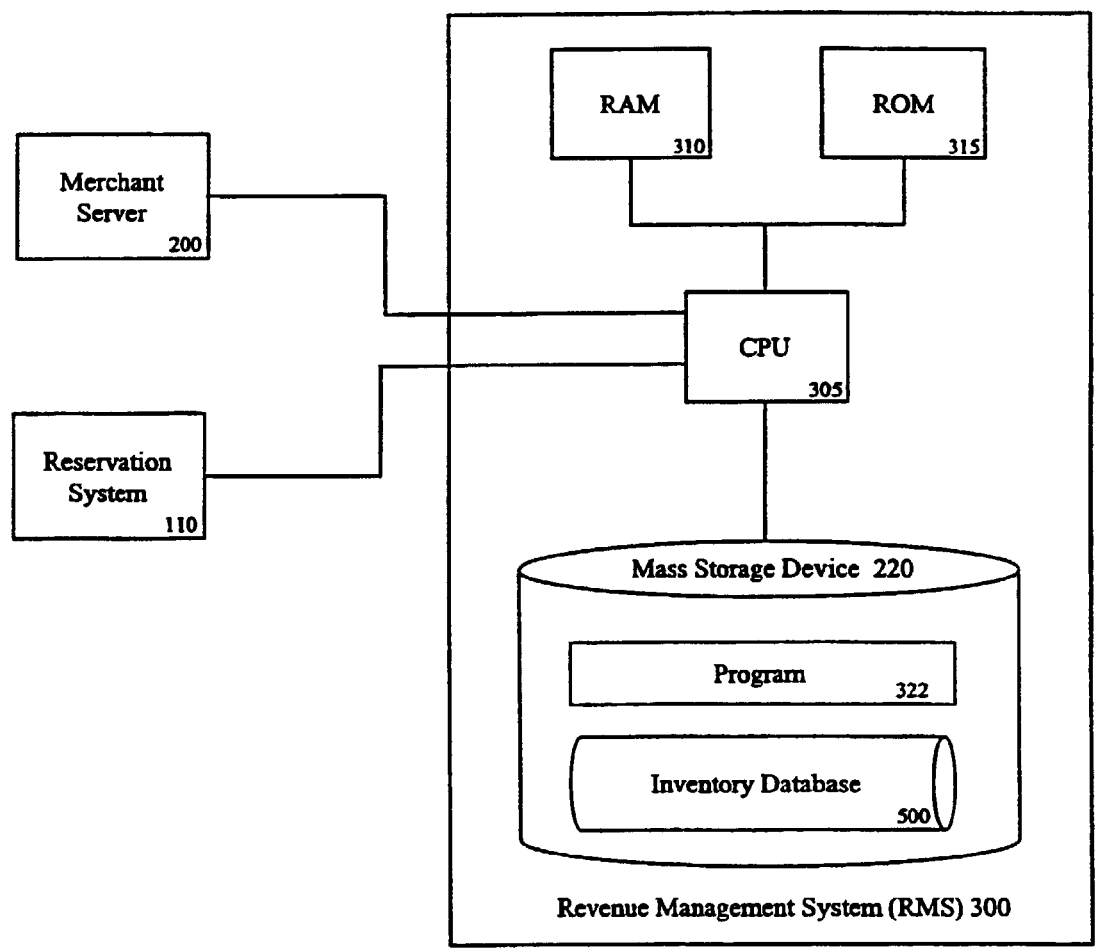
FIG. 3 is a block diagram depicting a RMS of FIG. 1.

In the illustrated embodiment shown in FIGS. 2 and 3, the merchant server 200 and RMS 300 computers each include a central processing unit (CPU) 205, 305, random access memory (RAM) 210, 310, read only memory (ROM) 215, 315, and mass storage device 220, 320, respectively. The RS 110 shown in FIG. 1 may also be implemented as a single general purpose computer similar to those shown in FIGS. 2 and 3. The RS 110 stores and executes program code and handles data necessary to reserve travel products according to known methods.

The CPU's 205, 305 of the merchant server 200 and RMS 300 comprise conventional microprocessors such as Intel Pentium processors electrically coupled to each of the merchant server and RMS's other elements. The CPU's 205 and 305 execute merchant server program code 222 and RMS program code 322 respectively, stored in one or more of their respective RAM 210, 310, ROM 215, 315, and mass storage devices 220, 230. The CPU's 205 and 305 are selected to be adequate to carry out the functions and processes described in connection with the merchant server 200 and RMS 300 in FIGS. 9-13.

Referring to FIG. 2, the mass storage device 220 of the merchant server 200 stores merchant server program code 222, an itinerary database 400, a benefit rating database 600, a benefit database 700 and a requester database 800. The itinerary database 400 contains information about the itineraries selected for a requester in response to a travel inquiry. The benefit rating database 600 associates a benefit rating with the difference between a preferred travel product and an alternate travel product. The benefit database 700 contains benefits associated with benefit ratings. The requester database 800 contains information related to each requester.

Referring to FIG. 3, the mass storage device 320 of the RMS 300 stores RMS program code 322 and inventory database 500. The inventory database contains an inventory of travel products. Sample content of the databases 400-800 are illustrated in FIGS. 4-8.

IV. Data Storage and Formats

Samples of the contents of the itinerary database 400, inventory database 500, benefit rating database 600, benefit database 700 and requester database 800 are shown in FIGS. 4-8, respectfully. The specific data and fields illustrated in these figures represent only one embodiment of the records stored in the databases used in the method and system. In most cases, the fields shown in FIGS. 4-8 are self explanatory. It should be understood that the data and fields, as well as the number of databases can be readily modified from the described embodiment and adapted to provide variations for operating the system and method described. Furthermore, each field may contain more or less information. For example, an address field may be divided into separate fields containing street address, apartment number, city, state, zip code, telephone number and e-mail.

Referring to FIG. 4, itinerary database 400 maintains a compilation of itineraries prepared in response to a travel inquiry submitted by a user. Each record in the itinerary database corresponds to one travel inquiry.

The itinerary database 400 shown in FIG. 4 is used by the merchant server to store itineraries prepared by the merchant server in response to travel inquiries. Referring to the sample records 401-402 illustrated in FIG. 4 of the itinerary database 400, each record contains data fields 410-470. These fields correspond to itinerary ID 410, requester ID 420, preferred itinerary 430, alternate itinerary 440, benefit rating 450, benefit 460 and offer status 470.

A record is created in the itinerary database 400 for each travel inquiry submitted by a requester. The data fields for each record are populated by the merchant server with information retrieved and collected from the RMS inventory database 500 and the requester database 800. The itinerary ID field 410 contains a unique itinerary ID number for each record in the database. The requester ID field 420 contains a unique requester ID number associated with each requester. The requester ID number is extracted from the requester database 800. The preferred itinerary field 430 and alternate itinerary field 440 contain information relating to the travel products associated with the preferred and alternate itineraries respectively. The preferred itinerary field 430 and alternate itinerary field 440 may each contain a plurality of entries wherein each entry represents one leg of the trip. For example, as shown in record 401 the preferred itinerary field 430 and alternate itinerary field 440 contain round trip flight information. The information stored in the preferred itinerary field 430 and alternate itinerary field 440 may be extracted from the RMS inventory database 500 and includes at least the travel date, flight number and class. In alternative embodiments, these fields may contain a cross reference to the corresponding travel product in the inventory database 500. The benefit rating field 450 and benefit field 460 store information related to the benefit associated with acceptance of the alternate itinerary. The benefit rating field 450 stores a rating value attributable to the differences between the preferred itinerary and the alternate itinerary. The benefit rating field 450 is populated by the merchant server using information extracted from the benefit rating database 600 discussed below. The benefit field 460 contains a benefit corresponding to the benefit rating associated with the alternate itinerary. The benefit field 460 is populated by the merchant server using information extracted from the benefit database 700 discussed below. The last field, offer status 470, contains information relating to whether the user has accepted the alternate itinerary. If the requester has accepted the alternate itinerary the merchant server marks the field accepted.

Figure 5A:
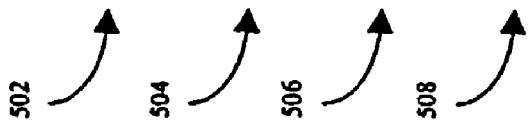

In one embodiment, the inventory database 500 shown in FIG. 5 stores an inventory of scheduled flights. Referring to the sample records 502 through 508 illustrated in FIG. 5A-B of the inventory database 500, each record contains data fields 515 through 580. These fields correspond to flight number 515, origin and destination (0 and D) pair 520, departure date 525, departure/arrival time 530, availability 535, current price 540, profit margin 550, current load factor 555, optimal load factor 560, projected load factor 570, optimal load factor discrepancy 575 and load factor threshold 580.

The records of the inventory database 500 are created by the RMS 300 in conjunction with the RS 110. In the illustrated embodiment there is a database record for each flight number or O and D pair. The RMS 300 and scheduling system cooperate to generate flight numbers, O and D pairs, departure dates, departure/arrival times and availability. The flight number field 515 contains a unique identifier for each flight. The O and D pair field 520 contains an airport identifier relating to the origin and destination of each flight. The departure date field 525 and departure/arrival time field 530 store the departure date and departure and arrival times for each flight.

The last eight fields of the inventory database 500 store primarily dynamic information relating to current booking levels. The RMS 300 populates and maintains these data fields relating to availability 535, current price 540, profit margin 550, current load factor 555, optimal load factor 560, projected load factor 570, optimal load factor discrepancy 575 and load factor threshold 580.

The availability field 535 stores information relating to fare classes and/or seating classes and the corresponding seating availability for each flight. The availability field 535 is initially generated by the RMS 300 in combination with a scheduling system to provide the seating capacities and class distributions of the plane assigned to the scheduled flight. The current price field 540 indicates the current price associated with a given flight for each seating and/or fare class on the flight. The profit margin field 550 indicates the profit earned on the sale of a seat on the flight for each class. The current load factor field 555 stores a percentage representing the number of tickets currently booked for a given flight and class verses the total number of tickets available for the flight and class. The optimal load factor field 560 stores the load factor associated with each class on a given flight that is estimated to produce near optimal revenue without damaging existing pricing structures. The projected load factor field 570 stores an estimated load factor associated with a given flight and class, based in part on the current load factor, historical sales data and the like. The optimal load factor discrepancy field 575 stores the load factor that is estimated to produce near optimal revenue without damaging existing price structure. The load factor threshold field 580 stores the minimum load factor associated with a given flight and class below which it is no longer acceptable for an airline to sell tickets for the flight.

Referring to FIG. 6, the benefit rating database 600 contains information relating the benefit rating associated with differences between a preferred travel product and an alternate product. Each record in the benefit rating database 600 corresponds to a potential difference between the preferred and alternate products. Referring to sample records 601 through 613 illustrated in FIG. 8, each record has a data field 620 corresponding to condition/feature and data field 630 corresponding to rating. The condition/feature field identifies a difference between the preferred and alternate itineraries. The rating field corresponds to rating point associated with the condition or feature. For example, if the alternate travel product has a destination airport between 20 and 50 miles from the destination airport of the preferred travel product a hypothetical benefit rating of eight has been assigned to the alternate travel product. As will be discussed in further detail below, the benefit rating database 600 is used in conjunction with the benefit database 700 to generate a benefit corresponding to an alternate travel product.

As illustrated in FIG. 7, the benefit database 700 contains information relating to the benefits associated with a particular benefit rating. Each record in the benefit database 700 corresponds to a different benefit rating level or range. Referring to sample records 701 through 706 each record in the benefit database 700 contains a total benefit rating field 710 and a benefit field 720. The total benefit field 710 identifies a benefit rating level or range. The benefit field 720 identifies benefits corresponding to the benefit rating. For example, a benefit rating of eight is associated with the benefit of 100 frequent flyer miles or a $40 discount on a car rental. This database is used by the merchant server in conjunction with the benefit rating database to select a benefit to associate with an alternate travel product.

Referring to FIG. 8, requester database 800 contains information relating to the requester. Each record in the requester database 800 corresponds to one requester or traveler. The requester database 800 shown in FIG. 8 is used by the merchant server to keep detailed records associated with each requester so as to facilitate reserving a travel product and customizing benefits offered to the requester in conjunction with certain embodiments of the method and system. Referring to sample records 801-803 illustrated in FIG. 8 of the requester database 800, each record contains data fields 810-820. The fields correspond to requester ID 810, requester name 811, address 812, phone, 814, credit card 816, preferred benefit 818 and accepted benefits 820.

The data fields for each record are populated by the merchant server and information provided by the requester. For example, the requester ID field 810 and accepted benefits field 820 are supplied by the user. The remaining fields are populated with information supplied by the requester. This information may be collected during a registration process or during the purchase of the requester's first travel product. The fields are primarily self explanatory. The requester ID field 810 stores a unique identification number assigned to each requester by the merchant server. The requester name field 811 stores each requester's name. The address field 812 stores the requester's mailing address and/or billing address. The credit card field 816 stores the requester's credit card information for billing purposes. The preferred benefit field 818 and accepted benefit field 820 store a preferred benefit requested by the requester and a record of benefits the requester has accepted in the past, respectively. Using the information stored in the preferred benefit field and the accepted benefit field, the merchant server may make a requester tailored benefit selection as will be discussed below. For example, the system may record whether a given requester accepted a benefit and offer that benefit again, or not offer that benefit again. Further, a requester may register her preference for a given benefit and receive that benefit exclusively or more often then others. For example, a given requester may prefer to sit in $1^{st}$ class, and is willing to accept an alternate itinerary in exchange for a $1^{st}$ class ticket at a coach fare. The benefit selection process is discussed in detail below in conjunction with FIG. 13.

V. Travel Inquiry Process

Figure 9:
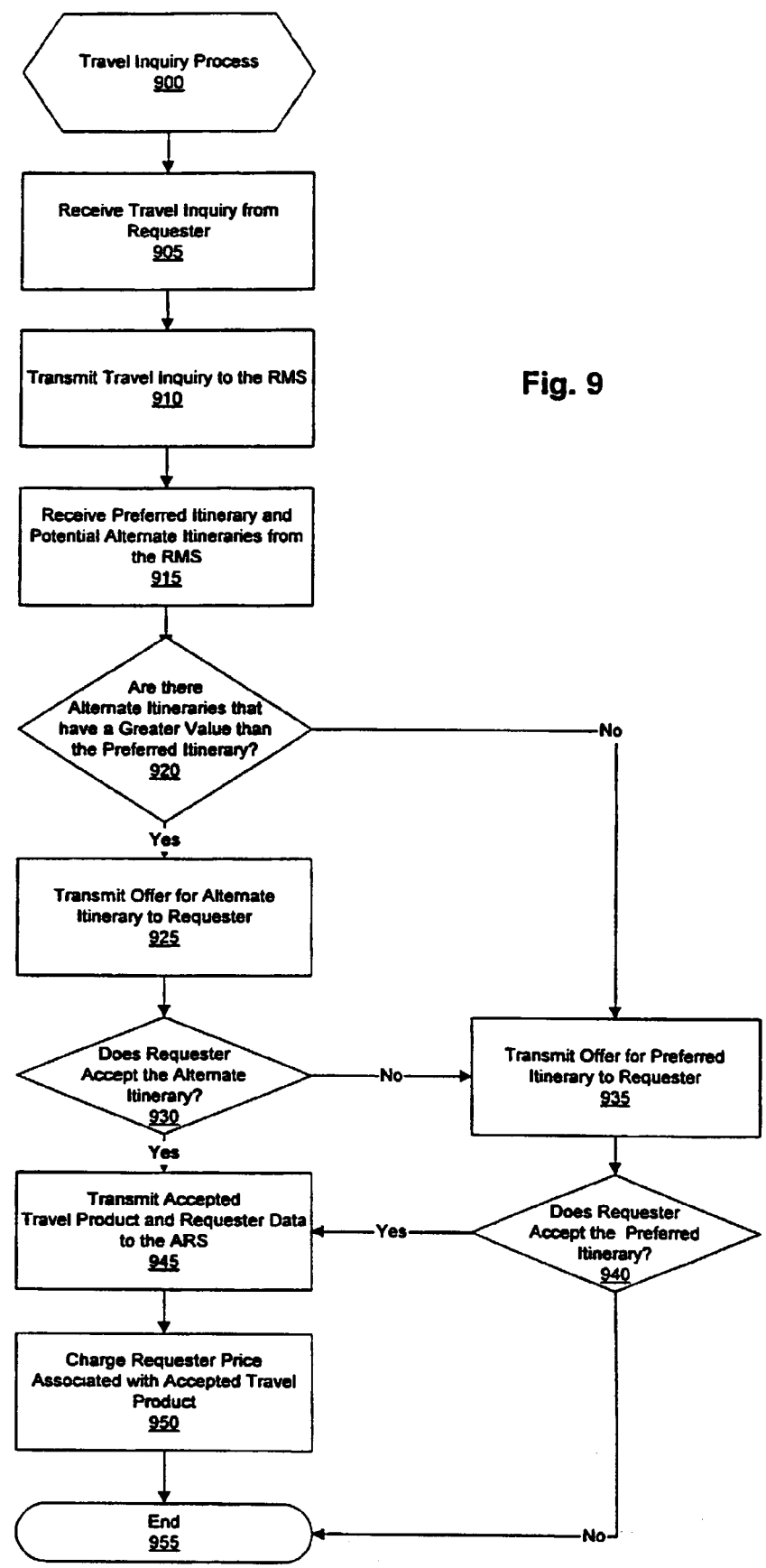
FIG. 9 is a flow chart illustrating a method for processing the sale of an airline ticket performed by a merchant server shown in FIG. 2.
Figure 10:
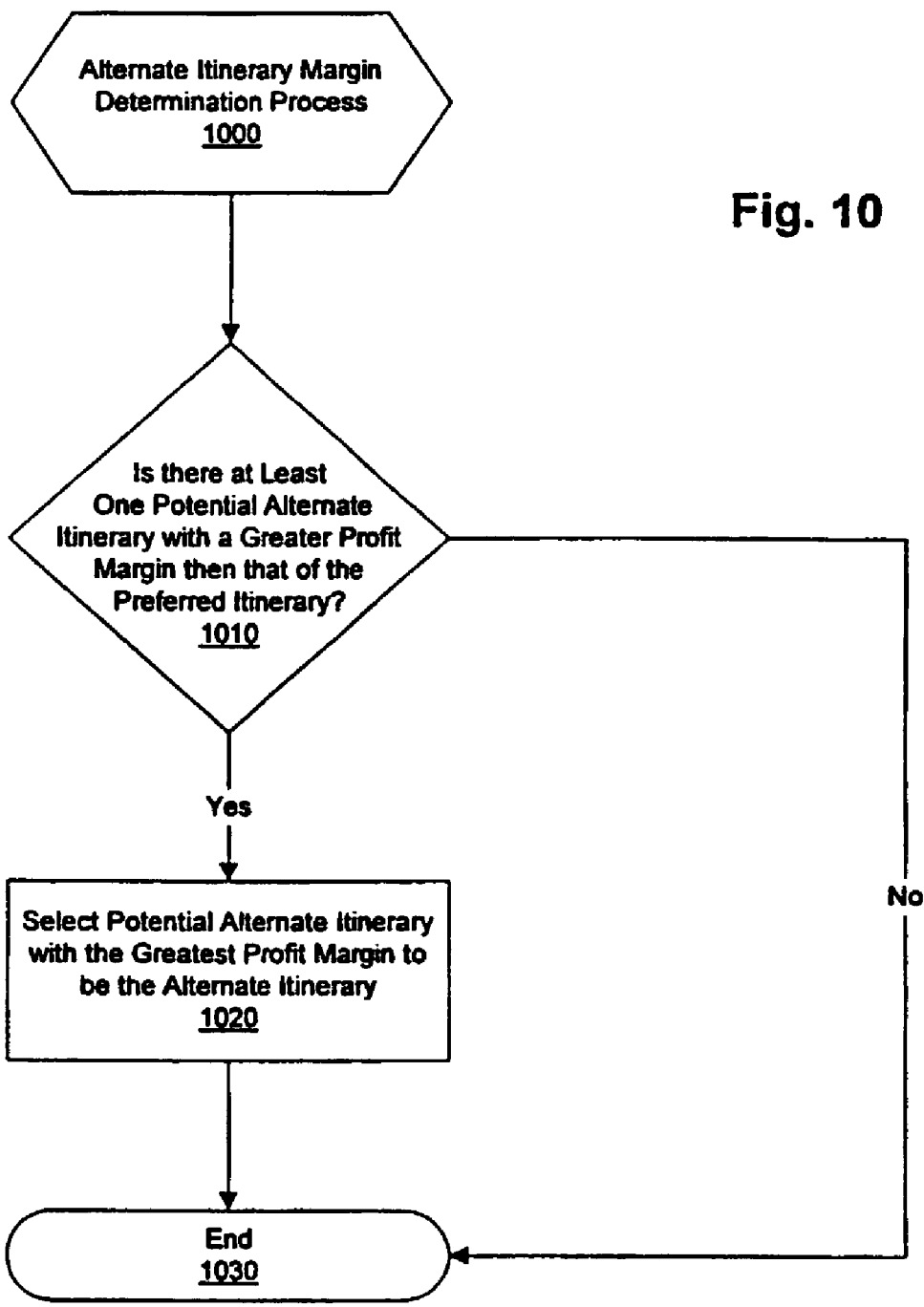
FIG. 10 is a flow chart illustrating a subroutine of the method performed in FIG. 8 for determining an alternate itinerary based on profit margin.
Figure 11:
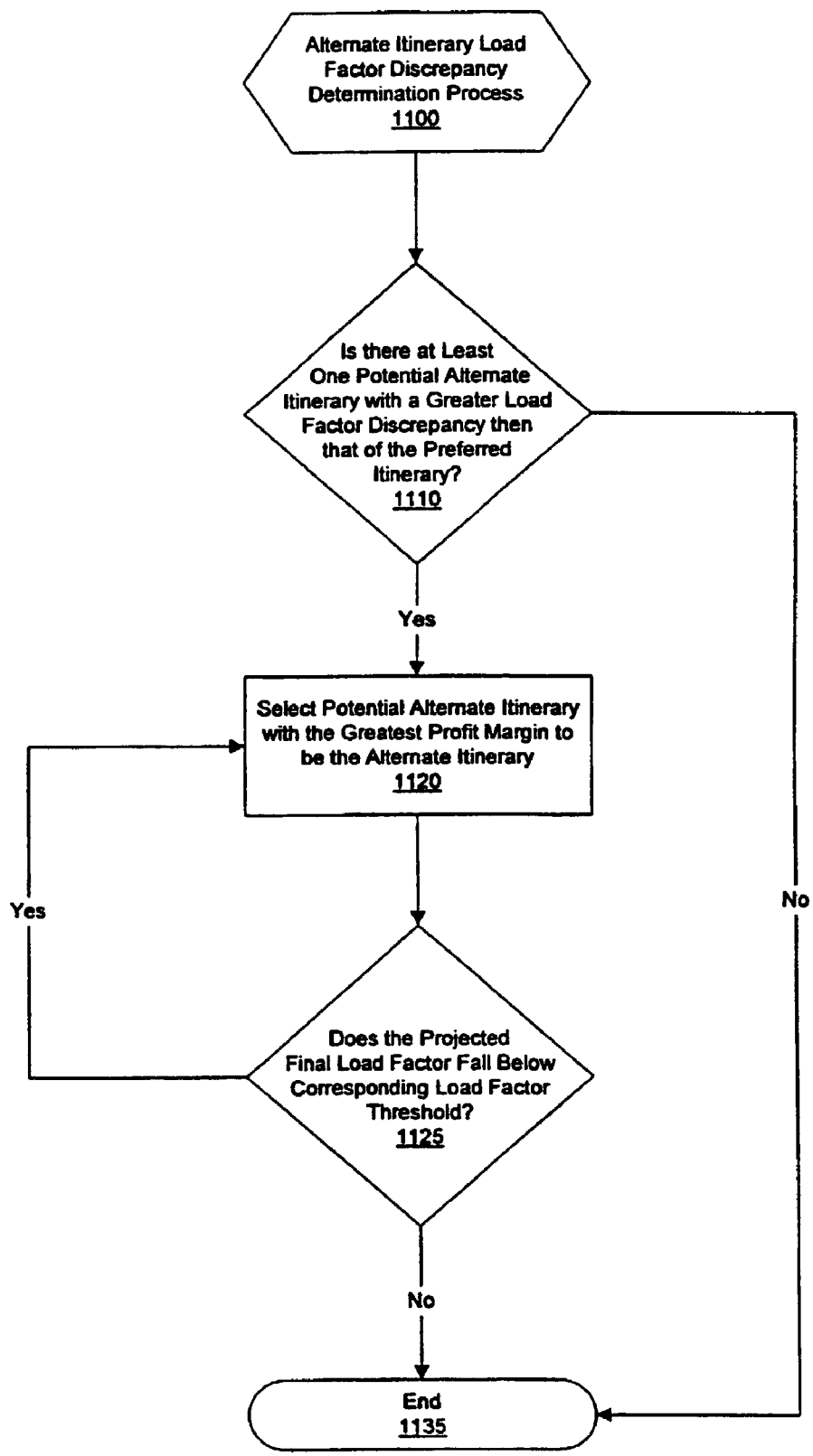
FIG. 11 is a flow chart illustrating a subroutine of the method performed in FIG. 8 for determining an alternate itinerary based on load factors.

In the illustrated embodiment, the travel product is an airline ticket or tickets comprising a flight travel itinerary and the requester is a traveler submitting a travel inquiry directly to a single merchant server 200. Referring to FIG. 9, the travel inquiry process begins at step 905 when a requester such as a traveler 120 submits a travel inquiry to the merchant server 200. A traveler 120 may submit an inquiry to a merchant server 200 directly or indirectly through a travel agent 140 or central reservation system 130. The travel inquiry comprises travel data that identifies a preferred itinerary for which the traveler would like to purchase a ticket. The travel inquiry may not identify a preferred itinerary, but instead a range of preferred travel parameters. Travel inquiry data may contain information such as the origin and destination (O and D), airline, flight number, travel dates and times, desired class and the like, descriptive of the traveler's preferred itinerary. If the preferred itinerary is for a round-trip ticket, the travel data may identify two flights—the departing and the returning flight. It is also contemplated that the travel inquiry may take the form of a conditional purchase offer submitted through a conditional purchase offer management system, such as priceline.com Incorporated, available at www.priceline.com. For further information regarding conditional purchase offer management systems, reference may be made to U.S. Pat. Nos. 5,794,207 and 6,085,169, herein incorporated by reference.

After receiving a travel inquiry, in step 910 the merchant server 200 transmits the travel inquiry to the RMS 300. The RMS 300 selects the preferred travel itinerary and one or more alternate itineraries from the inventory database 500 based on the travel inquiry. The preferred travel itinerary is the travel product from the inventory database that most closely matches the travel inquiry transmitted by the requester. An example of a preferred itinerary is shown in fields 430 of the itinerary database depicted in FIG. 4. The first preferred itinerary, shown in record 401 (Itinerary ID 99-001), identifies a round trip flight departing on Jul. 20, 1999 on flight number 980, and returning on Jul. 29, 1999 on flight number 1640. The second preferred itinerary, shown in record 402 (Itinerary ID 99-002), identifies a round trip flight departing on Jul. 29, 1999 on flight number 930, and returning on Aug. 14, 1999 on flight number 384. Further details concerning the above referenced flights may be found in the inventory database depicted in FIGS. 5A and 5B.

An alternate itinerary is any travel product other than the preferred travel product. The alternate itinerary should be similar enough to the preferred itinerary so as to be a reasonable substitute for the preferred itinerary. The RMS 300 may select alternate itineraries based upon requester or system defined tolerances for variation from the travel inquiry data. For example, the airline server 200 may only retrieve itineraries having (1) the same origin and destination (O and D) pair as that of the preferred itinerary, (2) departure dates that are within a specific range of days of the departure date associated with the preferred itinerary or (3) departure times that are within a specific time deviation of the departure time associated with the preferred itinerary.

By further example with reference to FIGS. 4, 5A and B, sample record 504, flight number 862, may be a possible alternative to flight number 1640 which is the returning flight associated with the preferred itinerary in record 401 of FIG. 4. Both flight number 862 and flight number 1640 depart from Cleveland and arrive in New York City, number 1640 landing at LGA, and number 862 landing at JFK. Both flights depart on the same day, but number 862 departs 4 hours later than number 1640. Depending on the defined limits of variation, flight number 862 could be retrieved as a possible alternate for flight number 1640.

In another example, referring to FIGS. 5A and B, flight number 930 depicted in record 508 is very similar to flight number 1580 depicted in record 506. The two flights share the same O and D pair and the same departure date. They differ in that flight number 1580 departs 6½ hours later than flight number 930. Depending again on the limits of variation, flight number 1580 could be retrieved as a possible alternate for flight number 930.

The RMS searches for all alternate flights that fall within the limits of variation. If the RMS 300 fails to determine at least one flight for an alternate itinerary, the RMS may send the merchant server 200 a signal indicating that no alternate itinerary could be determined. In this case the merchant server may then transmit to the requester an offer for a ticket consistent with the preferred itinerary as discussed below, including the flight numbers, dates and times of departure and the current price.

Assuming the RMS 300 found at least one alternate itinerary, in step 915, the RMS 300 communicates the preferred travel itinerary and one or more of the potential alternate itineraries to the merchant server 200. In step 920, the merchant server 200 then determines whether any of the potential alternate itineraries should be offered to the requester instead of the requester's preferred itinerary. In making this determination, the merchant server 200 typically determines which of the retrieved alternate itineraries would be of greater value or produce a more beneficial economic benefit for the airline, as compared to the preferred itinerary, if sold. As will be discussed below in conjunction with FIGS. 10-12, the merchant server 200 may consider a number of factors in this determination, including, for example, profit margins and load factors associated with both the preferred and alternate itineraries.

If there are no alternate itineraries that have a greater value to the seller than the preferred itinerary, in step 935 the merchant server 200 transmits an offer for the preferred itinerary. If the merchant server 200 identifies an alternate itinerary having a greater value than the preferred itinerary, in step 925 the merchant server 200 transmits an offer to sell the alternate itinerary. As will be discussed below with reference to FIG. 13, in alternate embodiments of the method and system, an associated benefit may be offered in conjunction with acceptance of the alternate itinerary. The benefit is offered to offset the variations in travel data imposed upon the requester by the alternate itinerary and to encourage the requester to accept the alternate itinerary. The system may randomize its selection of both alternate itineraries and benefits offered in order to prevent dilution of any particular alternate itinerary or benefit due to predictability of the alternate itinerary offer.

Proceeding to step 930, the merchant server determines whether the requester has accepted the alternate itinerary. If not, in step 935 the merchant server 200 transmits an offer to sell the preferred itinerary to the requester. In alternate embodiments, the offer for the preferred itinerary may be transmitted to the requester before or at the same time as an offer for the alternate itinerary. In yet other embodiments the merchant server 200 may send one or more additional alternate itineraries to the requester prior to sending the preferred itinerary. In step 940 the merchant server determines whether the requester has accepted the preferred itinerary. If the requester has rejecter the preferred itinerary the process ends at step 955.

If the requester has accepted either the alternate itinerary in step 930 or the preferred itinerary in step 940, the process proceeds to step 945. In step 945 the merchant server transmits the accepted itinerary data, any associated benefit and the requester data from the requester database 800 to the RS 110. In step 950, the RS 110 reserves and tickets the travel products associated with the accepted travel product, and charges the requester for the reserved and ticketed travel product. The process then concludes at 955.

Alternate Itinerary Margin Determination Process

The alternate itinerary margin determination process is a subroutine of step 920 of the travel inquiry process illustrated in FIG. 9 for determining the comparative value of a preferred and alternate itinerary. The alternate itinerary margin determination process is one of three alternate selection processes illustrated in FIGS. 10-12. In this process the determination as to the value of the sale of a travel itinerary is based on the profit margin associated with the itinerary. A profit margin is the difference between the price and the cost associated with an itinerary.

The alternate itinerary margin determination process 1000 begins at step 1010. In step 1010, the airline server determines whether any of the alternate itineraries have a greater profit margin than the preferred itinerary. If there are no alternate itineraries having a greater profit margin than the preferred itinerary the process ends at step 1030 and the preferred itinerary is transmitted to the requester as discussed above in conjunction with FIG. 9, step 935. If there is at least one alternate itinerary having a greater value than the preferred itinerary, the process proceeds to step 1020. In step 1020, the merchant server selects the alternate itinerary or itineraries to offer the requester in order of greatest value to the seller. The process then ends at step 1030 and the alternate itinerary or itineraries are transmitted to the requester as discussed above in conjunction with FIG. 9, step 925.

As an example, a requester may request an airline ticket departing, from CLE on Jul. 23, 1999 at 5:00 PM and arriving at LGA. The price associated with this ticket may be, for example, $175. The merchant server may determine that there is a similar flight departing from CLE and arriving at LGA on Jul. 23, 1999, departing at 8:00 PM rather than 5:00 PM. The price associated with the flight departing at 8:00 PM may be $200. Assuming that all airline tickets between CLE and LGA cost the airline the same amount (e.g., the same kind of jets are flown with the same amount of fuel, etc.), the profit margin associated with the alternate ticket is $25 greater than the first ($200−$175=$25). Thus, if the requester accepts the second ticket, the system will retain an extra $25. Taking this into consideration, the merchant server may choose to offer the requester the second ticket for the alternate itinerary before offering the first ticket for the preferred itinerary.

Alternate Itinerary Load Factor Discrepancy Determination Process

The alternate itinerary load factor discrepancy determination process is another subroutine of step 920 of the travel inquiry process illustrated in FIG. 9 for determining the comparative value of the alternate itinerary verse the preferred itinerary. The alternate itinerary load factor discrepancy determination process is the second of the three alternate selection processes. In this process the determination as to the value of the sale of a travel itinerary is based on the load factor discrepancy associated with each itinerary. A load factor discrepancy is the difference between the optimal load factor and either the current or projected load factor associated with each itinerary.

The RMS 300 calculates the projected load factor for a given itinerary by measuring the current load factor associated with a given flight and comparing it to historical sales data. The projected load factor represents an estimation of what the load factor associated with a given flight will be, on the flight date. Further, using known revenue management techniques, the RMS is able to approximate an optimal load factor associated with a given flight. The optimal load factor represents an estimation of the optimal value for the final load factor associated with a given flight (i.e., the value that will produce the most revenue without damaging the integrity of existing price structures).

The alternate itinerary load factor discrepancy determination process 1100 begins at step 1110. In step 1110, the merchant server determines whether there is at least one potential alternate itinerary with a greater load factor discrepancy than that of the preferred itinerary. If there are no alternate itineraries having a greater load factor discrepancy than the preferred itinerary the process ends at step 1135 and the preferred itinerary is transmitted to the requester as discussed above in conjunction with FIG. 9, step 935. If there is at least one alternate itinerary having a greater load factor discrepancy than the preferred itinerary the process proceeds to step 1120. In step 1120 the merchant server selects the alternate itineraries having the greatest load factor discrepancy.

This process directs requesters away from flights that are expected to achieve, or even surpass, their optimal load factors, and toward flights that are currently not expected to achieve their respected optimal load factors. In this way airlines may be able to more closely approximate optimal levels of revenue across a larger portion of their inventory. For example, the optimal load factor associated with a flight departing from CLE and arriving at LGA may be 75%, and the projected final load factor may be 60%. The load factor discrepancy in this case is 15% (75%−60%=15%). In an attempt to increase the projected final load factor of the flight, so as to more closely approximate the optimal load factor, the airline may offer tickets for the flight as part of an alternate itinerary.

In the illustrated embodiment, once the merchant server selects an alternate itinerary to offer, the process proceeds to step 1125. In step 1125, the merchant server determines whether the projected final load factor for the alternate itinerary falls below the corresponding load factor threshold. The load factor threshold is calculated by the RMS and is defined as the load factor value below which it is no longer profitable for the airline to sell tickets for that itinerary. For example, the load factor threshold may be assigned a value so as to offset the costs associated with operating the jet, paying employees, utilizing airport facilities, etc. If the projected final load factor associated with a given flight falls below this threshold, it is no longer profitable for the airline to operate the given flight. In this case the airline may attempt to direct enough requesters away from the flight in order to justify canceling the flight. This may be accomplished by offering alternate itineraries to requesters interested in purchasing tickets for the given flight. For example, the load factor threshold for a first flight from CLE to LGA may be 35%. The current projected final load factor for the first flight may be 30%. Requesters who request a ticket for the first flight may be directed to a second flight between CLE and LGA departing 4 hours later than the first flight, but having a current projected final load factor of 60% and an optimal load factor of 75%. It is more likely that the airline will be able to reach the optimal load factor associated with the second flight than the first, and it may be possible to cancel the first flight if enough requesters are directed away from the flight.

Proceeding to step 1125, if the projected load factor falls below the corresponding load factor threshold, the process repeats, returning to step 1120 and selecting the alternate itinerary having the next highest load factor discrepancy. If the projected load factor is above the corresponding load factor threshold the process ends at step 1135 and the merchant server transmits the alternate itinerary to the requester as discussed above in conjunction with FIG. 9, step 925.

Alternate Itinerary Class and Load Factor Determination Process

Figure 12:
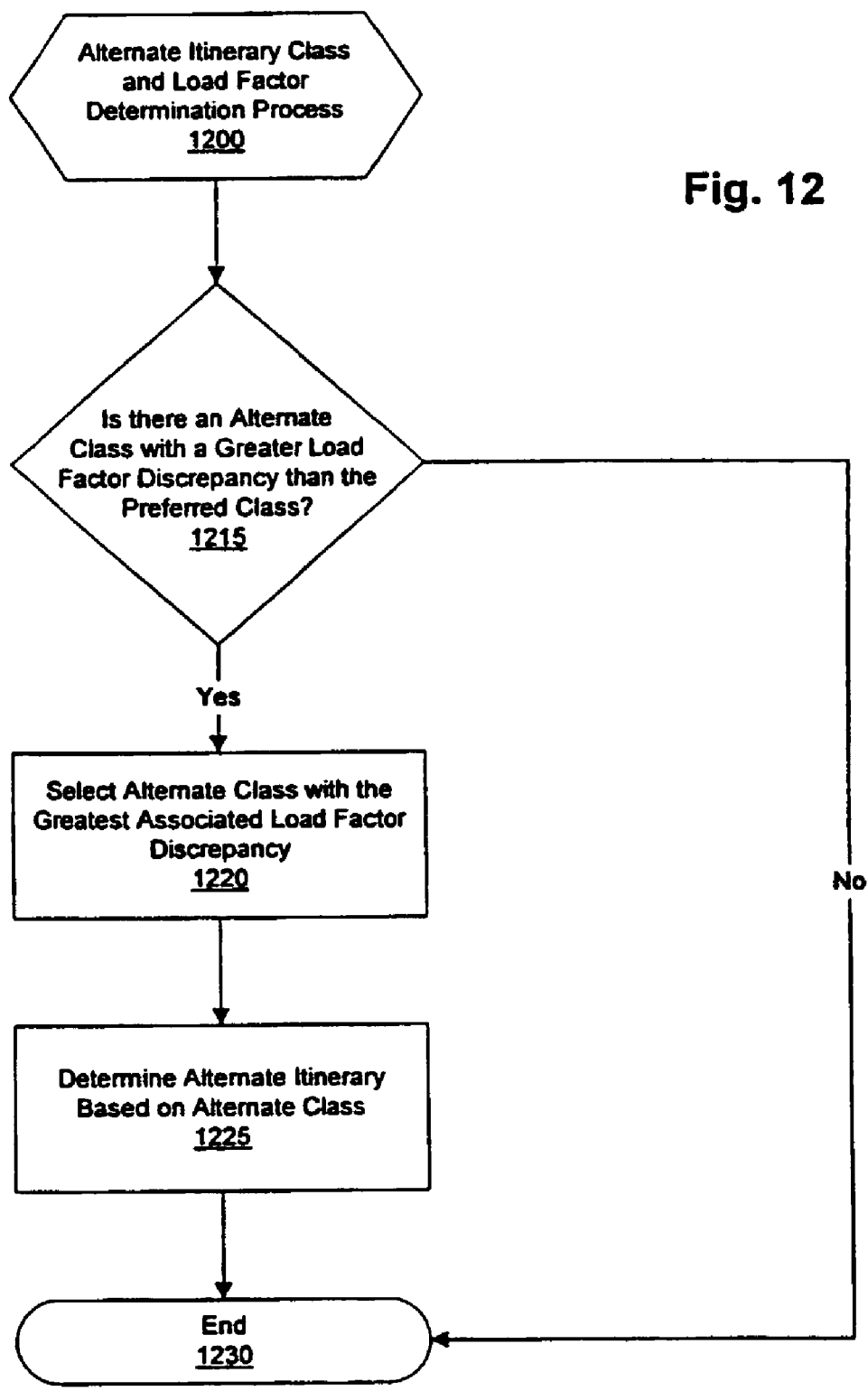
FIG. 12 is a flow chart illustrating a subroutine of the method performed in FIG. 8 for determining an alternate itinerary based on the class of the preferred itinerary.

The alternate itinerary class and load factor determination process illustrated in FIG. 12 is another subroutine of step 920 of the travel inquiry process illustrated in FIG. 9. The alternate itinerary class and load factor determination process is the third of the three illustrated alternate selection processes. In this process the determination as to the value of the sale of a travel itinerary is based on the load factor discrepancy associated with the class of a preferred itinerary with the load factor discrepancy of alternate classes.

The merchant server 200 may determine that, by changing the class of the preferred itinerary (i.e., from coach to first class), it may be able to open up space for another requester. For example, coach class tickets on a given flight may be in high demand, while first class tickets on the same flight may be in lower demand. By offering a requester who preferred a coach class ticket a first class ticket instead, the system may be able to sell the coach class ticket to a different requester. In effect the system may be able to sell a first class ticket (that would not have been otherwise sold) at a coach fare, and sell the coach class ticket (that the first requester would have bought) to a different requester, thus selling two tickets instead of one.

The alternate itinerary class and load factor determination process 1200 begins with step 1215. In step 1215, the merchant server compares the load factor discrepancy of the preferred class (the class of ticket the requester preferred) and the load factor discrepancies associated with other classes of tickets associated with the preferred itinerary. The merchant server 200 receives this information from the RMS 300 with the information relating to potential alternate itineraries. The load factor discrepancy associated with a class of ticket for a given itinerary measures the difference between the projected load factor for the class (i.e., the estimated number of tickets that will be booked for the class as compared to the total number of tickets available in the class) and the optimal load factor for the class (i.e., the estimated optimal number of tickets that should be booked for the class as compared to the total number of tickets available for the class). If there are no alternate classes having a greater load factor discrepancy than the preferred class, the process ends at step 1230 and the merchant server transmits the preferred itinerary to the requester as discussed above in conjunction with FIG. 9, step 935. If there are alternate classes having greater load factors than the preferred class, the merchant server proceeds to step 1220.

In step 1220, the merchant server selects the alternate class having the greatest load factor discrepancy. Having determined an alternate class, in step 1225, the merchant server determines an alternate itinerary based on the alternate class. For example, if the airline server determined that the load factor discrepancy associated with a coach ticket was greater than that of a first class ticket, the airline server may offer the requester a coach ticket on the same flight instead of a first class ticket in order to decrease the load factor discrepancy associated with coach class tickets to a more acceptable level.

In alternate embodiments, the system may attempt to determine whether the given requester is a business or leisure traveler, so that the system can offer an itinerary that is geared toward the type of traveler. For example, if the system determines that the requester is a business traveler, it may direct the requester to a business class or first class ticket. Such tickets typically generate more revenue as compared to lower class tickets, since business travelers are typically less price sensitive than leisure travelers. In order to determine what type of traveler a given requester is, the system may consider such factors as whether the preferred itinerary includes a Saturday night stay, or whether the purchase request was entered at least two weeks before the preferred date of departure, both of which usually indicate a leisure traveler.

Benefit Selection Process

Figure 13:
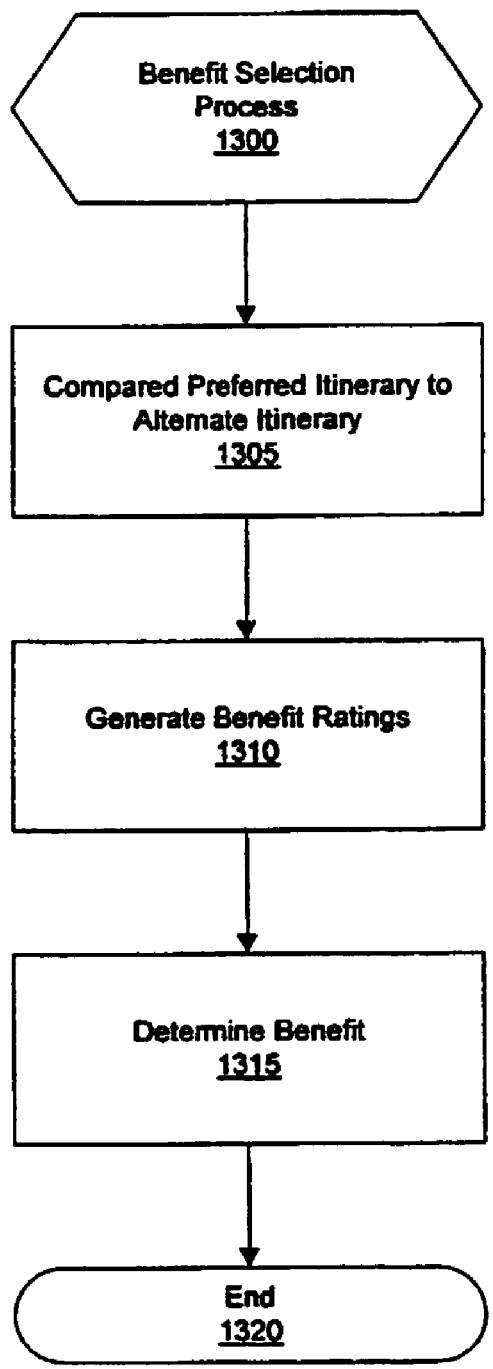
FIG. 13 is a flow chart illustrating a method for selecting a benefit to associate with a travel product.

A benefit selection process is illustrated in FIG. 13. In this embodiment of the present method and system, a benefit is selected and offered to the requester in exchange for the requester accepting the alternate itinerary. The extent of such benefits may be determined based on the differences between the preferred itinerary and the alternate itinerary.

The benefit selection process 1300 is a subroutine of step 920 of FIG. 9. The process begins at step 1305. In step 1305 the system compares the travel data for the preferred and the alternate itinerary to determine the differences. For example, referring to FIG. 4 record 401, the system compares the preferred itinerary (flight #980 and #1640) to the alternate itinerary (flight #980 and #862). Data relating to these flights is stored in the inventory database 500. In this case, the departing flight for the two itineraries is the same, but there are differences between the returning flights. Flight #1640 departs from CLE and arrives a LGA, while flight #862 departs from CLE and arrives at JFK. Further, flight #862 departs four hours later than flight #1640.

Subsequently, in step 1310, the merchant server uses the differences between the travel data of the requester's preferred itinerary and the travel data associated with the alternate itinerary to generate a benefit rating. Typically, the greater the differences between the two data sets, the greater the benefit rating. In the illustrated embodiment, the system queries a benefit rating database 600 to retrieve the benefit rating associated with the difference in each travel parameter. The system may weight certain travel parameters more than others in proportion with the burden the requester is asked to bear. For example, the time of departure may be weighted less than the date of departure, since it is typically less burdensome to alter a time of departure than a date of departure.

In the illustrated embodiment, the benefit ratings for each difference between the preferred and alternate itineraries are added together to generate a total benefit rating. For example, referring to the benefit rating database 600, the itinerary differences associated with record 401 of the itinerary database discussed above earn a total benefit rating of eight points— four points for arriving at an airport less than 20 miles away from the preferred airport, and four points for departing four hours later than the preferred departure time.

After generating the benefit rating, in step 1315 the merchant server determines a benefit to offer the requester based on the determined total benefit rating. In the illustrated embodiment, a benefit database 700 is maintained that associates total benefit rating with actual benefits. The system uses the determined benefit rating to query the benefit database 700 and retrieve the benefit associated with the given rating. The benefits associated with a given total benefit rating may be based on the actual value of the given benefit, the perceived value of the given benefit, the breakage rate associated with the benefit, and the like. The available benefits may also be based on a requester profile from the requester database 800, based on data such as a preferred benefit requested by the requester or past benefit accepted or rejected by the requester.

The benefit offered should be perceived by the requester as being at least of equal value to the inconvenience imposed upon the requester for altering his travel plans. For example, there may be only a slight benefit offered to the customer for pushing a departure time up an hour since the inconvenience typically associated with such a change is relatively low, while the benefit offered for changing the departure or arrival date may be significantly greater. Such benefits might include: (1) a discounted price, (2) extra frequent flyer miles, (3) package deals and (4) upgraded class of ticket.

The merchant server may offer the alternate itinerary for a discounted price, as long as the profits gained by the system from booking the alternate itinerary are at least equal to the discount. Although this may amount to creating a price-bias towards the alternate itinerary (as opposed to a product-bias), as long as the discount is only offered to the given requester, and the amount of the discount is determined on a per transaction basis, there is little risk of creating any dilutionary effects.

Some benefits, such as frequent flyer miles, have a high breakage rate associated with them. A breakage rate is defined as the number of benefits allocated but unused as compared to the total number of benefits allocated. For example, if an airline allocates 100 frequent flyer miles to a requester, and the requester only uses 50 of them prior to expiration, there would be a 50% breakage rate associated with the frequent flyer miles (50/100=50%). Frequent flyer miles thus function as a particularly good benefit to offer requesters, since they have both a high perceived value to many requesters and have a relatively high breakage rate associated with them.

The merchant server, in conjunction with other merchants (travel product sellers), may determine a package deal to offer the requester. A package deal is defined as a group of products that, if purchased by the requester, earns the requester a discount on at least one of the products in the group. The discount may be subsidized by one of the merchants. For example, in exchange for accepting an alternate itinerary, the airline server may offer a requester a discount on a hotel room in the destination city. The hotel may agree to offer the discount in exchange for the extra business the system is creating for the hotel by offering the package deal. Pricing products as a package is further beneficial in that it shields the individual prices of the underlying products so that the customer can not obtain the merchant's underlying price flexibility.

All of these exemplary benefits may have an expiration date associated with them to encourage requesters to purchase the alternate itinerary at the time that it is offered, and thus mitigate dilutionary effects. Market conditions in an airline environment change quickly so that the most beneficial alternate itinerary for the seller to sell, might not remain so for very long. Thus, encouraging customers to quickly accept alternate itineraries is important. For example, a requester may be offered an alternate itinerary with 200 extra frequent flyer miles if she accepts the offer within 24 hours of receiving it.

Once a benefit is selected in step 1315, the benefit selection process ends at step 1320. The process then proceeds as illustrated in step 925 though 955 of FIG. 9 except that a benefit is associated with the alternate itinerary. For example, the benefit is transmitted to the requester along with the alternate itinerary in step 925. The requester then accepts or rejects the alternate itinerary, including the benefit, in step 930. In other embodiments, the benefit may be offered before or after the alternate itinerary is offered.

If the requester accepts the alternate itinerary, in step 945 the system transmits the alternate itinerary, any benefit and the requester data to the reservation system for booking. Additionally, the system allocates the benefit to the requester. Thereafter the process proceeds as discussed above in conjunction with FIG. 9.

Although the above illustrations are directed primarily to the case of a traveler submitting a travel inquiry directly to a single merchant server 200, as illustrated in FIG. 1, it should be understood that in alternate embodiments, the traveler 140 may submit a travel inquiry through a travel agent 140 or central reservation service 130. In these embodiments travel agent 140 or central reservation service 130 may query a single merchant server or multiple merchant servers for preferred travel products matching the travel inquiry and alternate travel products within a define variation from the travel inquiry. The central reservation service or travel agent may then select which travel product to offer as an alternate travel product to the seller based on which offers the greatest benefit to the travel agent or central reservation service if sold. For example, one travel product seller may offer higher commissions for the sale of its travel products then another. Thus a travel agent or central reservation service may offer that travel product seller's product before another travel product seller's product. The central reservation service 130 or travel agent 140 may also handle selection and offering of a benefit in conjunction with acceptance of an alternate travel product. Accordingly, it should be understood that the methods and processes discussed above in conjunction with the RMS 300, merchant server 200 and reservation system 110 can similarly be handled by the central reservation service 130 or travel agent 140.

Although illustrative embodiments have been described herein in detail, it should be noted and will be appreciated by those skilled in the art, that numerous variations may be made within the scope of this method and system without departing from the principle of this method and system and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this method and system should be defined in accordance with the claims that follow.

What is claimed is:

1. A travel product sale offering processor-implemented method for offering a travel product for sale, comprising:
receiving via a communications network from at least one customer an electronic travel inquiry related to a transportation ticket, the travel inquiry including at least
a preferred origin,
a preferred destination,
a preferred class,
a preferred travel date, and
a preferred travel time,
and the transportation ticket comprising at least one of an airline ticket, a train ticket, and a cruise ticket;
querying from a tolerance database an acceptable travel date range and an acceptable travel time range;
retrieving from a travel records database a plurality of alternative transportation ticket records based on the travel inquiry, wherein retrieving the plurality of alternative transportation ticket records further comprises:

comparing by the processor an alternate origin associated with each of the plurality of alternative transportation ticket records to the preferred origin, comparing by the processor an alternate destination associated with each of the plurality of alternative transportation ticket records to the preferred destination, comparing by the processor an alternate travel date associated with each of the plurality of alternative transportation ticket records to the preferred travel date, comparing by the processor an alternate travel time associated with each of the plurality of alternative transportation ticket records to the preferred travel time, and retrieving by the processor only those alternative transportation ticket records having alternate origins matching the preferred origin, having alternate destinations matching the preferred destination, having alternate travel dates within the acceptable travel date range around the preferred travel date, and having alternate travel times within the acceptable travel time range around the preferred travel time;

determining by the processor a preferred itinerary margin for the travel inquiry and an alternate itinerary margin for each of the plurality of alternative transportation ticket records;

determining by the processor a preferred itinerary load factor discrepancy for the travel inquiry and an alternate itinerary load factor discrepancy for each of the plurality of alternative transportation ticket records, wherein determining an itinerary load factor discrepancy further comprises:

querying an optimal load factor associated with a given itinerary, querying a current load factor associated with the given itinerary, querying historical sales data associated with the given itinerary, computing by the processor a projected load factor based on the current load factor and the historical sales data, and computing by the processor the itinerary load factor discrepancy as the difference between the optimal load factor and the projected load factor;

determining by the processor a value differential associated with the travel inquiry and each of the plurality of alternative travel ticket records based on a combination of at least two of the preferred itinerary margin, the alternate itinerary margin, the preferred itinerary load factor discrepancy, and the alternate itinerary load factor discrepancy;

selecting at least one alternative travel ticket record from the plurality of alternative travel ticket records having a largest value differential;

determining a date difference between the preferred travel date and an alternate travel date associated with the at least one alternative travel ticket record;

determining a time difference between the preferred travel time and an alternate travel time associated with the at least one alternative travel ticket record;

determining a class difference between the preferred class and an alternate class associated with the at least one alternative travel ticket record;

querying from a benefit rating database a benefit rating weighting schedule;

computing by the processor a weighted benefit rating based on the weighting schedule, the date difference, the time difference, and the class difference;

querying a benefits database based on the weighted benefit rating;

retrieving at least one benefit for association with the at least one alternative travel ticket record based on the querying of the benefits database, wherein the benefit includes a conditional expiration feature that causes the benefit to expire within a predetermined time period unless the customer accepts the alternative travel ticket record within the predetermined time period; and providing via the communications network the at least one benefit and the at least one alternative travel ticket record for review by the customer.

* * * * *